SHAKE STRIP ASSEMBLY FOR ROOFING OR SIDING
Original Filed Dec. 8, 1967 2 Sheets-Sheet 1
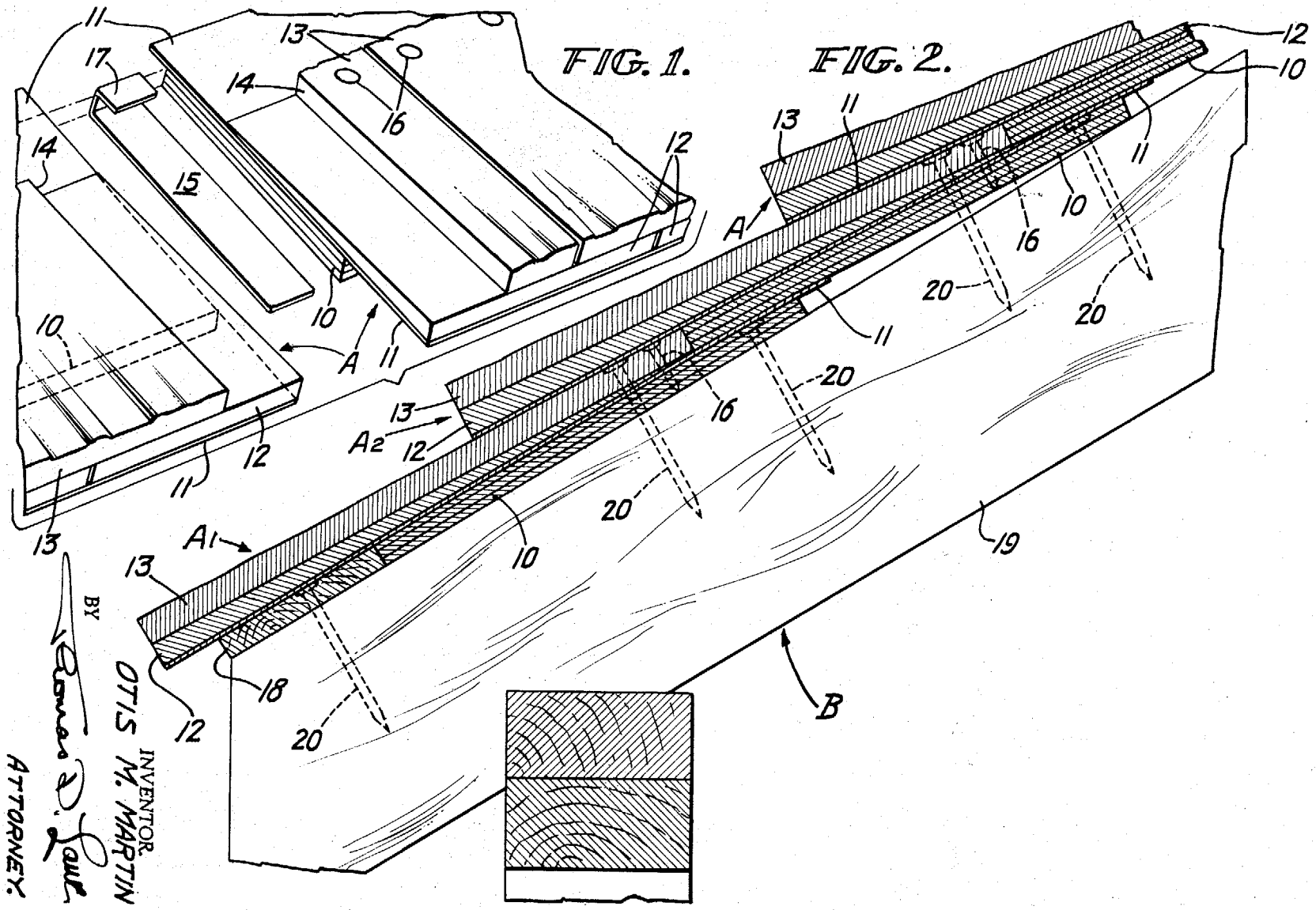
INVENTOR.
OTIS M. MARTIN
BY
Thomas D. Lane
ATTORNEY.

SHAKE STRIP ASSEMBLY FOR ROOFING OR SIDING
Original Filed Dec. 8, 1967 2 Sheets-Sheet 2
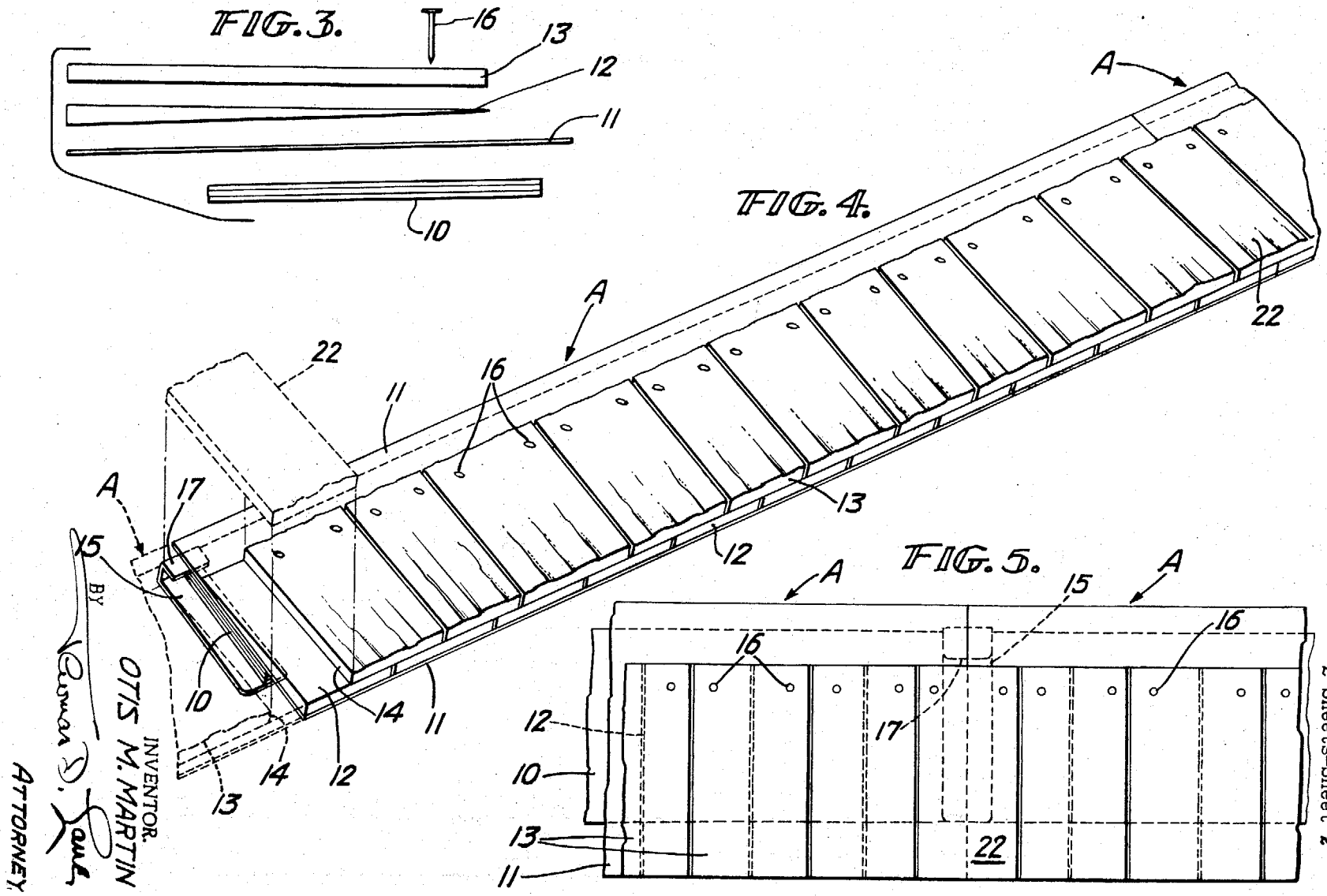
INVENTOR.
OTIS M. MARTIN
BY
Thomas D. Lane
ATTORNEY United States Patent Office Re. 27,502
Reissued Oct. 10, 1972

27,502
SHAKE STRIP ASSEMBLY FOR ROOFING OR SIDING

Otis M. Martin, San Jose, Calif., assignor to Ditz-Crane, San Francisco, Calif.

Original No. 3,440,777, dated Apr. 29, 1969, Ser. No. 689,144, Dec. 8, 1967. Application for reissue Dec. 21, 1970, Ser. No. 100,181
Int. Cl. B04d *1/36, 3/362, 13/00*
U.S. Cl. 52—94 14 Claims

Matter enclosed in heavy brackets [ ] appears in the original patent but forms no part of this reissue specification; matter printed in italics indicates the additions made by reissue.

ABSTRACT OF THE DISCLOSURE

A roof or side of a building is covered with self-gauging shake strip assemblies which provide their own sheathing. Each shake strip assembly comprises a base strip covered by a membrane with a first course of sawn shingles secured thereto and covered by a second, superposed course of shakes. The upper ends of the shakes are in downwardly spaced relation from the upper edge of the base strip, while their lower ends extend a selected distance below the lower edge of the base strip. The upper ends of the shakes serve as a gauge for positioning the base strip of a next higher shake strip assembly. While not essential, a metal clip or other means may be provided to interconnect and seal the abutting ends of shake strip assemblies of the same row, and to insure against water leakage therebetween. A preferred means for this purpose is to provide a blank space at each end of the course of shakes on each shake strip assembly, and to close these blank spaces by means of shutter shakes applied after the shake strip assemblies have been attached to a roof or wall.

*Prior art*

Many prior attempts have been made to provide a shake-like roofing or siding which would permit application without the necessity of bundling the shakes, transporting them in easily damaged bundles to the site, applying sheathing, applying waterproof membrane, hoisting the bundles of shakes to the roof or scaffold, breaking the bundles, and then applying the shakes, one at a time. While some of these prior shake-like structures have provided substantial cost savings over a real shake roof, some of them have not been sufficiently weather tight to permit them to be used on roofs, while many of them have not had the appearance of a real shake roof.

*Objects*

An object of the present invention is to provide a self-gauging shake strip assembly, which, when used to cover the roof or side of a building, will have the appearance and other advantages of a real shake roof or siding.

Another object of the invention is to provide a shake strip assembly having a blank space at each end thereof to receive a shutter shake, which covers and seals the joints between endwise adjacent shake strip assemblies.

Another object of the invention is to provide an improved shake strip assembly with means for sealing the joints between endwise adjacent shake strip assemblies.

The foregoing objects and advantage of the invention will be apparent from the following description and the accompanying drawings, wherein:

FIG. 1 is a fragmentary, perspective view showing the end portions of two shake strip assemblies embodying the invention and a joining and sealing clip therefor, the shake strip assemblies being separated endwise from each other.

FIG. 2 is a fragmentary, vertical, transverse, sectional view in enlarged scale taken through the eaves of a building roofed with the shake strip assemblies.

FIG. 3 is an exploded view in side elevation drawn to substantially the same scale as FIG. 1, and showing the elements of a shake strip assembly separated from each other.

FIG. 4 is a perspective view of one of the shake strip assemblies as it appears with two other shake strip assemblies in endwise abutting assembled relation therewith, a shutter [single] *shingle* being shown in elevated offset relation thereto.

FIG. 5 is a fragmentary, vertical plan view showing the abutting end portions of two of the shake strip assemblies joined to each other by a sealing clip.

Referring to the drawings in detail, the roof or walls of a building can be covered with what appears to be natural wood shakes by means of a plurality of preassembled shake strip assemblies A, which can be applied in a uniform and symmetrical manner by any [roof] *roofer* or carpenter, or even by an amateur having no special training or high degree of skill.

Each shake strip assembly A comprises a base strip *or sheathing* 10, which may be a board, but preferably is of plywood. Each base strip 10 is covered with a membrane 11 of suitable material, such as tarred felt, which is co-terminal with the ends of the base strip 10, extends upwardly above the upper edge of the base strip a selected distance, and projects below the lower edge thereof, preferably the same distance as do superposed courses of *shingle-like members, such as,* sawn shingles 12 and shakes 13 which are laid thereon in the following manner:

Upon the membrane 11, with their upper ends aligned, and spaced downwardly a selected distance from the upper edge of the base strip 10, is laid a course of conventional, sawn shingles 12. These shingles 12 are of random width, and are flush with both ends of the base strip 10.

Upon each course of the sawn shingles 12 is laid a course of shakes 13, which like regular or conventional shakes, have one side thereof formed by splitting and the other side formed by sawing. The shakes 13 and shingles 12 are attached to the base strip in any suitable manner, for example by nails 16. The shakes at both ends of each course thereof preferably are spaced inwardly from the ends of the base strip 10 a selected distance, for example two inches, so as to leave a blank space 14 at each end of the shake course on each shake strip assembly A. To insure weather tightness, the joints between adjacent sawn shingles 12 and those between the superposed shakes 13 should be broken or staggered by at least 1½ inches, or such other minimum distance as may be required by the building code of the locality where the shake strip assemblies are to be used.

In making conventional shakes, wood blocks of random width, and usually 24 inches long, have shake blanks split therefrom varying in thickness from ½ inch to 1¾ inches. These shake blanks are then sawn in two, usually free hand, by a diagonal band saw cut running from one end of the blank to the other. This saw cut divides each blank into two shakes, each shake having a feather edge of substantially zero thickness at one end thereof. and the full thickness of the blank at the other. Any waviness in this diagonal saw cut results in a thin spot in one of the shakes and a corresponding thick spot in the other.

In making the shakes 13 of the present invention, however, the shake blanks need not be as long as is the case with regular shakes, since the shakes 13 are only 15 inches long. Also, the shake blanks are all approximately only ne inch in thickness, and are cut in two medially of their hickness by a straight saw cut parallel to one side of the lank, since the shakes 13 are of even thickness throughut their length. These are important simplifying cost educing and safety factors in the manufacture of the hakes, since it is a dangerous and exacting job to make he free-hand diagonal cuts which produce regular shakes, vhile the illustrative shakes 13 can be made on autonatic or semi-automatic machinery, using a fence paralel to the plane of the saw blade as a guide.

With the sawn shingles 12 and the shakes 13 in superosed courses on the base strip 10, and their lower ends rojecting downwardly a selected distance below the ower edge of the base strip, the assemblies are secured ogether by suitable attaching means, such as nails 16, riven through both courses and into the base strip 10.

The portion of the shakes which are exposed to the veather can be varied by varying the width of the base trip 10 and the spacing of the upper ends of the shakes 3 from the upper edge of the base strip. Suitable dimenions are as follows:

The lower edge of the membrane 11 and the lower nds of the shakes 13 and sawn shingles 12 superposed hereon project 5 inches below the lower edge of the ase strip 10, the shakes and shingles each being 15 nches long. The base strip 10 is ½ inch thick, and 12 nches wide, and the upper ends of the shakes 13, which erve as a gauge for positioning the next row of shape trip assemblies, are spaced 2 inches from, and parallel o, the upper edge of the base strip 10 upon which they re laid. The membrane 11 extends one inch above the ipper edge of the base strip 10, which makes the width f the membrane 18 inches, the width of a half-roll of he material. While these measurements are not limitng, they provide satisfactory siding or roofing, with 10 nches of the shakes exposed to the weather.

The length of the shake strip assemblies A is not naterial and can be varied at the option of the manuacturer or contractor. However, a satisfactory length is or 8 feet, which makes for easy and convenient handling.

For securely interconnecting the abutting ends of endvise adjacent shake strip assemblies A, and for sealing he joints therebetween, a plurality of clips 15 may be rovided. Each clip 15 is of suitable material, such as veather resistant sheet metal, and has a reversely bent, ectangular hook 17 formed in its upper end. This hook 7 is of a size to fit snugly over the upper edges of the butting ends of two base strip assemblies as shown in IG. 4, the reversely extending portion of the hook 17 eing of a length less than the spacing of the upper ends f the shakes 13 and sawn shingles 12 from the upper dge of the base strip 10.

In using the invention, for example on a roof structure as shown in FIG. 2, a starting strip 18 of suitable width nd thickness is laid adjacent the lower ends of the rafters 9. Since the required position of the lower ends of the hakes 13 and shingles 12 of the lowermost row A1 of hake strip assemblies may be varied from one job to nother, depending upon such variables as whether or ot a gutter is to be provided, and the appearance desired y the architect or builder, the starting strip is located s desired, or as set forth in the drawings or specifications f each individual job. With the starting strip 18 nailed o the rafters 19, the first or lowermost row A1 of shake trip assemblies is laid, end-to-end, preferably starting t one end of the roof, with the lower edge of the base trip 10 of each shake strip assembly of this first row butting the upper edge of the starting strip 18 and the rojecting lower ends of the shakes and singles overying the starting strip.

The shape strip assemblies are nailed to the rafters 19 y nails 20, driven through the shape strip assemblies in e area thereof above the portion of the shakes which re to be exposed to the weather. A roofer or carpenter vill be able to judge this area without marking, but for amateur installation, or if desired, a line not shown marking the lower edge of the nailing zone may be marked on the shakes during manufacture of the shake strip assemblies.

Joint clips 15, if desired, may be fitted in the manner described previously herein to the abutting ends of the base strips of endwise adjacent shake strip assemblies. The shake strip assemblies A of the second row A2 thereof are similarly nailed to the rafters 19 by nails 20 driven through the aforementioned nailing zones.

While any leakage in the joints between endwise adjacent shake strip assemblies would be minimal, even without sealing means, a preferred structure for sealing these joints is shown in FIGS. 1, 4 and 5. Here the shakes 13 are spaced from both ends of the base strip 10 and the course of sawn shingles 12 by a desired distance, for example 2 inches, and a shutter shake 22, of a width to fit into the blank space 14 thus provided, is fitted therein and nailed in place as shown in FIGS. 4 and 5.

After the lowermost row A1 of shake strip assemblies has thus been laid, nailed to the rafters and provided with the shutter shakes 22, a second row A2 of shake strip assemblies is laid, as best shown in FIG. 2, with the lower edge of the base strip 10 of each shake strip assembly of the second row overlapping the upper edges of the base strips of the first row, and the lower edges of the base strip 10 of the second row A2 abutting the upper ends of the shakes 13 of the first row A1. The shakes 13 of the first row A1, therefore, thus act as a gauge or guide for the shake strip assemblies of the second row A2. The joints between endwise adjacent shake strip assemblies in each row must be staggered or broken so as not to lie between the same two rafters or other supports as those of the row therebelow or thereabove.

Subsequent rows of the shake strip assemblies are similarly laid on and attached to the rafters, joined by end clips 15 or provided with shutter shakes 22 or other joint sealing means, as desired, until the roof is completely covered.

Gutters, hips, valleys, etc. may be made in conventional ways, or otherwise as desired.

While illustrated and described herein as for roofing, it will be obvious that the present invention can also be used for siding, and the terms "roof," "roofing," and the like as used herein are intended to include siding.

The invention provides an easily manufactured, easily transported and easily applied roofing and siding material which can be applied directly to studding or rafters, or over existing roofing, and has the appearance, strength weather resistance and durability of a real shake roof. The sawn shingles 12 can be of much lower quality than those ordinarily used for roofing, and still be adequate, since they are shielded by the superposed shakes. The shakes, also, being shorter, are less expensive than ordinary shakes and since they are sawed to a guide, and are of uniform thickness, they will have a long and uniform life.

While I have illustrated and described a preferred embodiment of the present invention, and have described the invention as employing shakes and shingles made of wood, it will be understood, however, that various changes and modifications may be made in the materials, for example composition, asbestos, etc., and other details thereof without departing from the scope of the invention as set forth in the appended claims.

I claim:

1. A shake roof structure comprising a plurality of shake strip assemblies, each shake strip assembly comprising a base strip of selected length and width, a course of sawn shingles laid along each base strip, the lower ends of the shingles projecting a selected distance below the lower edge of the base strip, a course of shakes superposed on the course of sawn shingles, the upper ends of the shakes being spaced uniformly from the upper edge of the base strip, and the lower ends of the shakes projecting a selected distance below the lower edge of the base strip, the upper ends of the shakes being of sufficient thickness to engage the lower edge of the base strip of a next successive shake strip assembly, and the width of the base strip, the length of the shakes, and the distance the upper ends of the shakes are spaced from the upper edge of the base strip upon which the shakes are mounted being such that when successive rows of shake strip assemblies are laid on a supporting structure with the lower edge of one shake strip assembly overlapping the upper edge of a next lower shake strip assembly, and abutting the upper ends of the shakes of such next lower shake strip assembly, selected portions of the shakes of such next lower shake strip assembly will be exposed to the weather below the lower ends of the shakes of said one shake strip assembly.

2. A shake roof structure as claimed in claim 1 wherein a blank space of selected width is left at each end of the course of shakes on each base strip, and a shutter shingle is provided for each shake strip assembly of a width approximately twice the width of each such blank space for fitting into the blank space between the ends of the courses of shakes of two endwise adjacent shake strip assemblies.

3. A shake roof structure as claimed in claim 1 wherein the course of shingles on each base strip terminates substantially flush with the ends of the base strip.

4. A shake roof structure as claimed in claim 1 wherein a membrane is interposed between the base strip and the course of shingles thereon of each shake strip assembly.

5. A shake roof structure as claimed in claim 3 wherein the membrane projects below the lower edge of its base strip approximately the same distance as the lower ends of the shingles.

6. A shake roof structure as claimed in claim 1 wherein a starting strip of selected width and thickness is secured in place along the lower edge of a portion of a building covered by the roof structure, and the shake strip assemblies of the lowermost row thereof are laid with the lower edges of their base strips abutting the upper edge of the starting strip, and the projecting lower portions of their shakes and shingles overlapping the starting strip.

7. A shake roof structure as claimed in claim 1 wherein the joints between endwise abutting shake strip assemblies in the same row are provided with interconnecting sealing clips, each clip being of stiff, strong sheet material and comprising a flat clip portion underlying one such joint, and a reversely bent clip portion fitted snugly over the upper edge portions of the base strips of the adjacent shake strip assemblies.

8. A shake roof structure comprising a plurality of shake strip assemblies laid in overlapping rows on a roof framing structure, each shake strip assembly comprising a base strip of selected length, width and thickness, a selected lower edge portion of each base strip, except those in the lowermost row, being superposed on an upper marginal edge portion of a next lower base strip, a waterproof membrane covering the base strip and projecting below the lower edge thereof a distance sufficient to overlap the membrane and a selected upper portion of the shakes of a next lower shake strip assembly, a course of sawn shingles laid along each base strip and superposed on the membrane thereon, the lower ends of the shingles projecting below the lower edge of the base strip a distance substantially equal to that of the membrane, a course of shakes superposed on the course of sawn shingles, the upper ends of the shakes being spaced downwardly by a uniform selected distance from the upper edge of the base strip, the shakes being of a length to project below the lower edge of the base strip a distance not less than that of the underlying course of sawn shingles on the same base strip.

*9. A shake roof structure comprising a plurality of shake strip assemblies, each shake strip assembly comprising:*

*a base strip of selected length and width,*

*a course of shingle-like members laid along each base strip, the lower ends of the members projecting a selected distance below the lower edge of the base strip,*

*a course of shakes terminating short of and superposed on the course of said members, the upper ends of the shakes being spaced uniformly from the upper edge of the base strip, and the lower ends of the shakes projecting a selected distance beyond the lower edge of the base strip, the upper ends of the shakes being of sufficient thickness to engage the lower edges of the base strip of a next successive shake strip assembly, and*

*the width of the base strip, the length of the shakes, and the distance the upper ends of the shakes are spaced from the upper edge of the base strip upon which the shakes are mounted being such that when successive rows of said shake strip assemblies are laid on a roof supporting structure with the lower edge of one shake strip assembly overlapping the upper edge portion of a next lower shake strip assembly and adjacent to the upper ends of the shakes of such next lower shake strip assembled, selected portions of the shakes of such next lower shake strip assembly will be exposed to the weather below the lower ends of the shakes of said one shake strip assembly.*

*10. A shake roof structure comprising a plurality of shake strip assemblies laid in overlapping horizontal rows on a roof supporting structure, each shake strip assembly comprising:*

*a base strip of selected length, width and thickness, a selected lower marginal edge portion of each base strip, except those in the lowermost row, being superposed on an upper marginal edge portion of a next lower base strip to provide a double thickness overlap,*

*a waterproof membrane covering the base strip and projecting below the lower edge thereof a distance sufficient to overlap the corresponding membrane and a selected upper portion of the shakes of a next lower shake strip assembly,*

*a course of shingle-like members laid along each base strip and superposed on the membrane thereon, the lower ends of the members projecting below the lower edge of the base strip a distance substantially equal to that of the membrane,*

*a course of shakes superposed on the course of said members and secured to the base strip, the upper ends of the shakes being spaced by a uniform selected distance from the upper edge of the base strip, the shakes being of a length to project beyond the lower edge of the base strip a distance not less than that of the underlying course of said members on the same base strip.*

*11. A strip assembly adapted to be secured to a supporting structure with other strip assemblies in successive horizontal rows, each assembly being adapted to be located between like upper and lower assemblies and comprising:*

*a base sheating strip of selected length and width,*

*a layer of surfacing material overlying and secured to the base strip, the surfacing material being dimensioned to project a selected distance beyond the lower edge of the base strip and to form an upper edge located a selected distance short of the upper edge of the base strip,*

*the lower margin of the base strip being adapted to be positioned to overlie the upper margin of the base strip of the next lower assembly to form a*

*double thickness overlap and with the upper edge of the surfacing of the next lower assembly being in proximity with the lower overlapping edge of the base strip of the first named assembly and underlying the lower projecting portion of the surfacing material of the first named assembly,*

*the upper margin of the base strip of the first named assembly being adapted to underlie the lower margin of the base strip of the next upper assembly to form a double thickness overlap and the upper edge of the surfacing material of the first named assembly being disposed adjacent the lower edge of the base strip of the next upper assembly and underlying the lower projecting portion of the surfacing material of the next upper assembly.*

*12. An assembly as in claim 11 in which the surfacing material includes a course of shakes, the upper ends of the shakes forming the upper edge of the surfacing and the lower ends of the shakes forming the lower projecting portion of the surfacing.*

*13. An assembly as in claim 12 together with a waterproof membrane disposed between the shakes and the base strip.*

*14. In a shake roof structure, a shake strip assembly adapted to be secured to a supporting structure with other shake strip assemblies in horizontal rows and with a uppermost row overlying a horizontal starter strip on the supporting structure, each assembly of the lower row comprising:*

*a base sheating strip of selected length and width,*

*a course of shingles overlying the base strip, the lower ends of the shingles projecting a selected distance beyond the lower edge of the base strip and overlying the starter strip,*

*a course of shakes superposed on the course of shingles, the upper ends of the shakes extending beyond and spaced uniformly from the upper edge of the base strip, and the lower ends of the shakes projecting a selected distance below the lower edge of the base strip to overlie the starter strip and the lower portions of the shingles, the upper ends of the shakes being adapted to be positioned adjacent the lower edge of the base strip of a next successive shake strip assembly in underlying relationship with the lower end portions of shakes thereon.*

References Cited

The following references, cited by the Examiner, are of record in the patented file of this patent or the original patent.

UNITED STATES PATENTS

| | | | |
|---|---|---|---|
| 2,192,810 | 3/1940 | Angier | 52—545 |
| 2,328,977 | 9/1943 | Hasenburger et al. | 52—520 X |
| 2,384,686 | 9/1945 | Kraus | 52—540 |
| 3,095,671 | 7/1963 | Fink et al. | 52—560 X |
| 3,333,384 | 8/1967 | Brady | 52—540 X |

PRICE C. FAW, Jr., Primary Examiner

U.S. Cl. X.R.

52—461, 478, 547, 551, 560